United States Patent
Takahashi et al.

(10) Patent No.: US 10,331,139 B2
(45) Date of Patent: Jun. 25, 2019

(54) NAVIGATION DEVICE FOR AUTONOMOUSLY DRIVING VEHICLE

(71) Applicant: TOYOTA JIDOSHA KABUSHIKI KAISHA, Toyota-shi, Aichi-ken (JP)

(72) Inventors: Norihiro Takahashi, Sunto-gun (JP); Koji Taguchi, Isehara (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 43 days.

(21) Appl. No.: 15/206,543

(22) Filed: Jul. 11, 2016

(65) Prior Publication Data

US 2017/0031364 A1 Feb. 2, 2017

(30) Foreign Application Priority Data

Jul. 28, 2015 (JP) ................................. 2015-148325

(51) Int. Cl.
| | |
|---|---|
| *G05D 1/02* | (2006.01) |
| *G01C 21/20* | (2006.01) |
| *G01C 21/36* | (2006.01) |
| *G05D 1/00* | (2006.01) |
| *G01C 21/34* | (2006.01) |

(52) U.S. Cl.
CPC ........... *G05D 1/0212* (2013.01); *G01C 21/20* (2013.01); *G01C 21/3461* (2013.01); *G01C 21/3605* (2013.01); *G05D 1/0088* (2013.01)

(58) Field of Classification Search
CPC .................................................. G05D 1/0212
See application file for complete search history.

(56) References Cited

U.S. PATENT DOCUMENTS

| | | | | |
|---|---|---|---|---|
| 6,591,172 | B2 * | 7/2003 | Oda | G05D 1/027 |
| | | | | 701/23 |
| 9,188,985 | B1 * | 11/2015 | Hobbs | G01C 21/34 |
| 9,528,850 | B1 * | 12/2016 | Hobbs | G01C 21/34 |
| 9,581,460 | B1 * | 2/2017 | McNew | G01C 21/3667 |
| 9,582,004 | B2 * | 2/2017 | Rothoff | G05D 1/0088 |
| 9,688,288 | B1 * | 6/2017 | Lathrop | B60W 50/14 |
| 9,903,725 | B2 * | 2/2018 | Sato | G01C 21/34 |
| 2004/0068366 | A1 | 4/2004 | Nisiyama | |
| 2006/0149464 | A1 | 7/2006 | Chien | |
| 2013/0325335 | A1 | 12/2013 | Kee et al. | |
| 2016/0298976 | A1 * | 10/2016 | Sato | G08G 1/096827 |

(Continued)

FOREIGN PATENT DOCUMENTS

| | | |
|---|---|---|
| JP | 2004-125726 A | 4/2004 |
| JP | 2004-257852 A | 9/2004 |

(Continued)

*Primary Examiner* — Hussein Elchanti
*Assistant Examiner* — Michael A Berns
(74) *Attorney, Agent, or Firm* — Sughrue Mion, PLLC

(57) ABSTRACT

In a navigation device for the autonomously driving vehicle, a continuation degree of autonomous driving on the paths found by a path searcher is calculated by a continuation degree calculator. In addition, a path for the host vehicle to travel is selected by the path selector from the paths found by the path searcher based on the degree of continuation of the autonomous driving. Therefore, it is possible to select a path for the host vehicle travelling by autonomous driving while including the degree of continuation of the autonomous driving in conditions for selecting the path.

12 Claims, 12 Drawing Sheets

(56) References Cited

U.S. PATENT DOCUMENTS

| | | | |
|---|---|---|---|
| 2016/0305787 A1* | 10/2016 | Sato | G05D 1/0088 |
| 2016/0356623 A1* | 12/2016 | Matsumoto | G01S 19/42 |
| 2017/0219364 A1* | 8/2017 | Lathrop | G01C 21/206 |
| 2017/0259832 A1* | 9/2017 | Lathrop | B60W 50/14 |
| 2017/0284823 A1* | 10/2017 | McNew | G01C 21/3697 |

FOREIGN PATENT DOCUMENTS

| | | |
|---|---|---|
| JP | 2006-189415 A | 7/2006 |
| JP | 3928537 B2 | 6/2007 |
| JP | 2009-156685 A | 7/2009 |
| JP | 2013-253956 A | 12/2013 |
| JP | 2015-032291 A | 2/2015 |
| WO | 2014/139821 A1 | 9/2014 |

* cited by examiner

NAVIGATION DEVICE FOR AUTONOMOUSLY DRIVING VEHICLE

TECHNICAL FIELD

The present invention relates to a navigation device for an autonomously driving vehicle.

BACKGROUND

In the related art, a navigation device is known, which searches for a plurality of paths for a host vehicle to travel and selects a path for the host vehicle to travel from the plurality of paths.

For example, in Japanese Unexamined Patent Publication No. 2013-253956, a navigation device for an electric vehicle that selects a path in which the power consumption is minimized is disclosed.

SUMMARY

Incidentally, in recent years, a technology that causes a host vehicle to travel by autonomous driving has been proposed. Whether or not the host vehicle can continuously travel by autonomous driving depends on situations on the path or the like. However, in the related art described above, a degree of continuation of the autonomous driving is not included in conditions for selecting the path.

Therefore, an object of the present invention is to provide a navigation device for a vehicle that can select a path for a host vehicle travelling by the autonomous driving while including the degree of continuation of the autonomous driving in the conditions for selecting the path.

According to an aspect of the present invention, a navigation device for an autonomously driving vehicle configured to select a path for an autonomously travelling host vehicle includes: a position estimator configured to estimate a position of the host vehicle; a destination setter configured to set a destination of the host vehicle; a path searcher configured to search for a path for the host vehicle to travel based on the position estimated by the position estimator and the destination set by the destination setter; a continuation degree calculator configured to calculate a continuation degree of the autonomous driving in the path found by the path searcher; and a path selector configured to select the path for the host vehicle to travel from the paths found by the path searcher based on the continuation degree calculated by the continuation degree calculator.

According to this configuration, the continuation degree of the autonomous driving on the paths found by the path searcher is calculated by the continuation degree calculator. In addition, the path for the host vehicle to travel is selected by the path selector from the paths found by the path searcher based on the continuation degree of the autonomous driving. Therefore, it is possible to select the path for the host vehicle travelling by autonomous driving while including the degree of continuation of the autonomous driving in conditions for selecting the path.

The continuation degree calculator may calculate the continuation degree based on a density of non-operation points where the continuation of the autonomous driving becomes difficult on the paths found by the path searcher.

At the non-operation points where the continuation of the autonomous driving becomes difficult, the driving mode can be switched to manual driving from autonomous driving by the driver of the host vehicle. Therefore, the density of the non-operation points directly affects whether the time of performing the manual driving by the driver is continuous or intermittent. According to the configuration described above, the continuation degree is calculated by the continuation degree calculator based on the density of non-operation points where the continuation of the autonomous driving becomes difficult on the paths found by the path searcher. Therefore, it is possible to select the path for the host vehicle travelling by autonomous driving while including the density of the non-operation points that directly affects whether the time of performing the manual driving by the driver is continuous or intermittent in the conditions for selecting the path.

In addition, the navigation device for the autonomously driving vehicle may further include: a continuation degree display configured to display the continuation degree of the path calculated by the continuation degree calculator to occupants of the host vehicle; and an input receiver to which an instruction from the occupants of the host vehicle is input. The path selector may select the path for the host vehicle to travel from the paths found by the path searcher based on the instruction input to the input receiver.

According to this configuration, the continuation degree of the path calculated by the continuation degree calculator is displayed to the occupants of the host vehicle by the continuation degree display, and the instruction from the occupants of the host vehicle is input to the input receiver. In this way, the occupants can input the instruction while taking the continuation degree into consideration. In addition, the path selector selects the path for the host vehicle to travel from the paths found by the path searcher based on the instruction input to the input receiver. In this way, it is possible to select the path for the host vehicle to travel by autonomous driving while including the instruction from the occupants in which the continuation degree is taken into consideration, in the conditions for selecting the path.

According an aspect of the present invention, the degree of continuation of the autonomous driving is included in the conditions for selecting the path, and then, the path for the autonomously travelling host vehicle can be selected.

DETAILED DESCRIPTION

Hereinafter, embodiments of the present invention will be described in detail using the drawings.

First Embodiment

Figure 1:
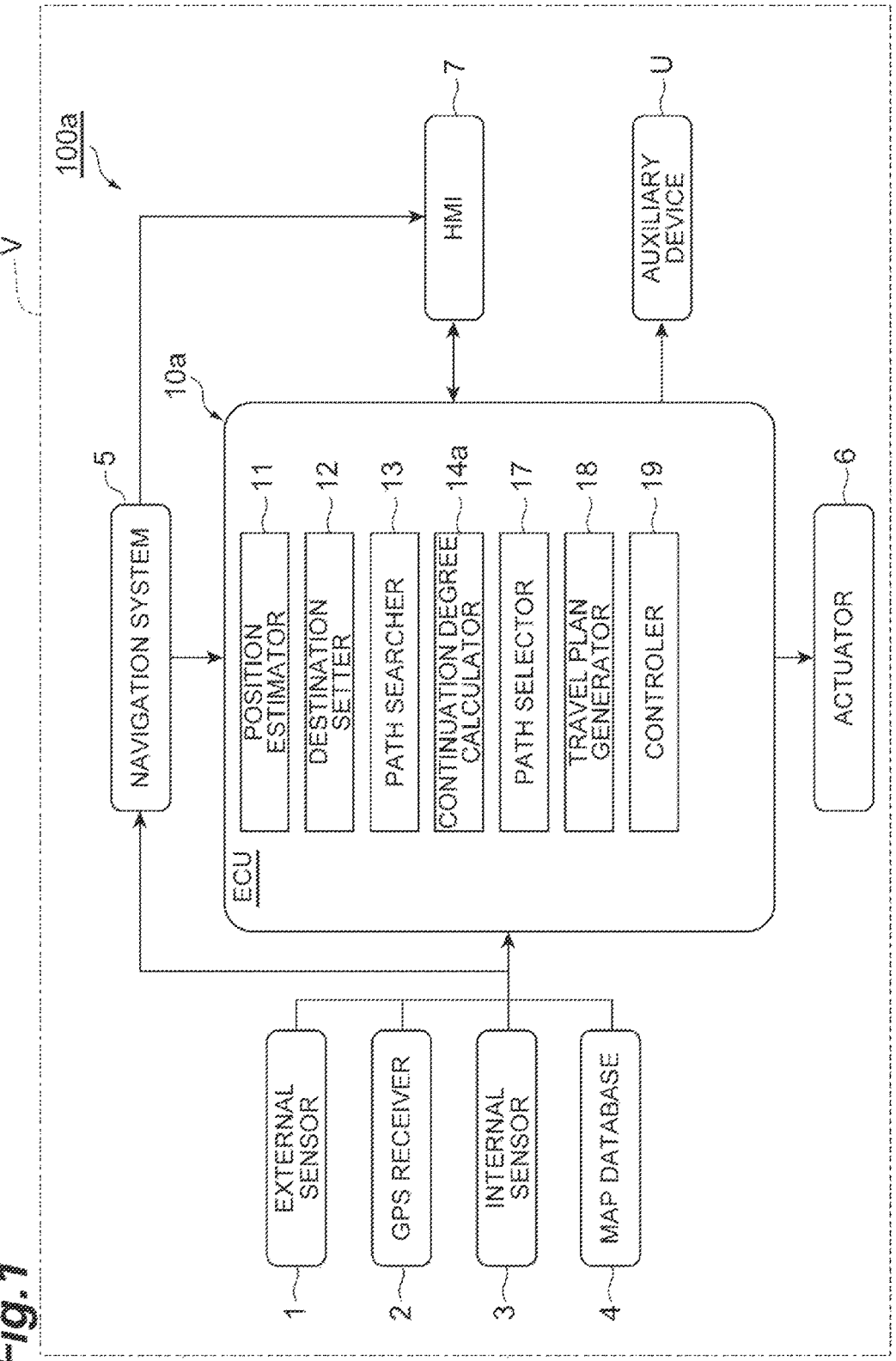
FIG. 1 is a block diagram illustrating a configuration of a navigation device for the autonomously driving vehicle in a first embodiment.

As illustrated in FIG. 1, a navigation device 100a for an autonomously driving vehicle in a first embodiment is mounted on a host vehicle V such as a passenger car. The navigation device 100a for the autonomously driving vehicle causes the host vehicle V to drive in autonomous driving. The autonomous driving means an operation that a driving operation of the host vehicle V such as a steering operation and an acceleration or deceleration operation is controlled without a manual driving operation by the driver of the host vehicle V. The autonomous driving includes, for example, a driving state in which the driving operation of only any of the steering operation and the acceleration or deceleration operation is performed by the autonomous driving operation for the autonomous driving and the other driving operation is performed by the manual driving operation by the driver of the host vehicle V. The navigation device 100a for the autonomously driving vehicle can change the driving state of the host vehicle V to the autonomous driving from the manual driving and to the manual driving from the autonomous driving. The navigation device 100a for the autonomously driving vehicle selects a path on which the host vehicle V travels by autonomous driving.

As illustrated in FIG. 1, the navigation device 100a for the autonomously driving vehicle includes an external sensor 1, global positioning system (GPS) receiver 2, an internal sensor 3, a map database 4, a navigation system 5, an actuator 6, a human machine interface (HMI) 7, an electronic control unit (ECU) 10a, and an auxiliary device U.

The external sensor 1 is a detection device that detects an external situation which is information around the host vehicle V. The external sensor 1 includes at least one of a camera, radar, and a laser imaging detection and ranging (LIDAR). The camera is an imaging device that images the external situation of the host vehicle V.

The camera is, for example, provided on the inside of windshield of the host vehicle V. The camera transmits image information relating to the external situation of the host vehicle V to the ECU 10a. The camera may be a monocular camera or may be a stereo camera. The stereo camera has two imaging units that are arranged so as to reproduce a binocular parallax. The image information from the stereo camera includes information in the depth direction.

The radar detects an obstacle outside of the host vehicle V using a radio wave (for example, a millimeter wave). The radar detects the obstacle by transmitting the radio wave to the surroundings of the host vehicle V and receiving the wave reflected from the obstacle. The radar transmits the detected obstacle information to the ECU 10a. When a sensor fusion is performed, it is possible to transmit the received information of the radio wave to the ECU 10a.

The LIDAR detects the obstacle outside the host vehicle V using light. The LIDAR transmits the light to the surroundings of the vehicle, measures the distance to the reflection point by receiving the light reflected from the obstacle, and then, detects the obstacle. The LIDAR transmits the detected obstacle information to the ECU 10a. When a sensor fusion is performed, it is possible to transmit the received information of the reflected light to the ECU 10a. The camera, the LIDAR, and the radar are not necessarily provided in an overlapping manner.

The GPS receiver 2 receives signals from three or more GPS satellites and measures the position of the host vehicle V (for example, the latitude and longitude of the host vehicle V). The GPS receiver 2 transmits the measured position information of the host vehicle V to the ECU 10a. Instead of the GPS receiver 2, another means for specifying the latitude and the longitude of the host vehicle V may be used. In addition, it is possible to have a function of measuring the orientation of the host vehicle V in order to collate the result of measuring by the sensors and map information described below.

The internal sensor 3 is a detection device that detects the travelling state of the host vehicle V. The internal sensor 3 includes at least one of a vehicle speed sensor, an acceleration sensor, and a yaw rate sensor. The vehicle speed sensor is a detection device that detects the speed of the host vehicle V. As the vehicle speed sensor, for example, a wheel speed sensor is used, which is provided on vehicle wheels of the host vehicle V, a drive shaft rotating integrally with vehicle wheels and detects a rotational speed of the vehicle wheels, or the like. The vehicle speed sensor transmits the detected vehicle speed information (vehicle wheel speed information) to the ECU 10a.

The acceleration sensor is a detection device that detects an acceleration of the host vehicle V. The acceleration sensor includes, for example, a longitudinal acceleration sensor that detects acceleration in the longitudinal direction of the host vehicle V and a lateral acceleration sensor that detects a lateral acceleration of the host vehicle V. The acceleration sensor transmits, for example, the acceleration information of the host vehicle V to the ECU 10a. The yaw rate sensor is a detection device that detects a yaw rate (rotational angular velocity) around the vertical axis of the center of gravity of the host vehicle V. As the yaw rate sensor, for example, a gyro sensor can be used. The yaw rate sensor transmits the detected yaw rate information of the host vehicle V to the ECU 10a.

The map database 4 is a database in which map information is included. The map database 4 is formed, for example, in a hard disk drive (HDD) mounted on the host vehicle V. In the map information, for example, position information of roads, information on road types (for example, types of a curved section or a straight section, and a curvature of the curve), position information of intersections, and branch points are included. In addition, as described below, information relating to the path on which the vehicle V travels and information relating to the non-operation point on which the continuation of the autonomous driving becomes difficult are included in the map information. In addition, a road toll and information on types of the road such as an ordinary road or a highway may be included in the map information. Furthermore, when the navigation device 100a for the autonomously driving vehicle uses the position information of a shielding structure such as a building or a wall and the simultaneous localization and mapping (SLAM) technology, an output signal from the external sensor 1 may be included in the map information. The map database 4 may be stored in a computer in a facility such as an information processing center which is capable of communicating with the host vehicle V.

The navigation system 5 is a device that performs a guidance for a driver of the host vehicle V to a destination set by the occupants (including the driver) of the host vehicle V, when the host vehicle V travels by manual driving. The navigation system 5 calculates a travel route of the host vehicle V based on the position information of the host vehicle V measured by the GPS receiver 2 and the map information in the map database 4. The route may be a route on which a possible lane is specified in a road section of multi-lane. The navigation system 5 calculates, for example, a target route from the position of the host vehicle V to the destination and performs notification to the driver of the target route by displaying on a display or a voice output through a speaker. The navigation system 5, for example, transmits the target route information of the host vehicle V to the ECU 10a. The navigation system 5 may be stored in a computer in a facility such as an information processing center which is capable of communicating with the host vehicle V. In addition, the navigation system 5 may be incorporated in the ECU 10a in combination with a configuration included in the ECU 10a which selects the path of the host vehicle V which travels by autonomous driving.

The actuator 6 is a device that executes the travel control of the host vehicle V. The actuator 6 includes at least a throttle actuator, a brake actuator, and a steering actuator. The throttle actuator controls a supply amount (throttle opening degree) of air to an engine according to a control signal from the ECU 10a, and controls the driving power of the host vehicle V. When the host vehicle V is a hybrid vehicle or an electric vehicle, the driving power is controlled by the control signal from the ECU 10a being input to a motor which is a source of the driving power without the throttle actuator being included.

The brake actuator controls a brake system according to the control signal from the ECU 10a and controls the braking power given to the wheels of the host vehicle V. For example, a hydraulic brake system can be used as the brake system. The steering actuator controls the driving of an assist motor that controls steering torque in the electric power steering system according to the control signal from the ECU 10a. In this way, the steering actuator controls the steering torque of the host vehicle V.

The HMI 7 is an interface that performs an input and output of information between occupants of the host vehicle V and the navigation device 100a for the autonomously driving vehicle. The HMI 7 includes, for example, a display panel for displaying the image information for the occupants, a speaker for voice output, an operation button or a touch panel for the occupants to perform the input operation, and a microphone for the occupants to perform a voice input. An instruction for setting the destination is input to the HMI 7 by the occupants. In addition, an instruction for starting or stopping the autonomous travelling is input to the HMI 7 by the occupants. The HMI 7 may perform the outputting of the information to the occupants using a wirelessly connected mobile information terminal or may receive an input operation of the occupant using the mobile information terminal.

The HMI 7 may directly control the auxiliary device U based on the operation of the occupants without the intervention of the ECU 10a.

The auxiliary device U is a device that can usually be operated by the driver of the host vehicle V. Devices that are not included in the actuator 6 are collectively called as the auxiliary device U. The auxiliary device U here includes, for example, direction indicator lamps, headlights, and wipers.

The ECU 10a controls the operation of the navigation device 100a for the autonomously driving vehicle. The ECU 10a is an electronic control unit that includes a central processing unit (CPU), read only memory (ROM), random access memory (RAM), and the like. The ECU 10a executes various controls by loading programs stored in the ROM on the RAM and causing the CPU to execute the programs. The ECU 10a may be configured from a plurality of electronic control units. The ECU 10a includes a position estimator 11, a destination setter 12, a path searcher 13, a continuation degree calculator 14a, a path selector 17, a travel plan generator 18, and a controller 19.

The position estimator 11 estimates the position of the host vehicle V on the map based on the position information of the host vehicle V received from the GPS receiver 2 and the map information in the map database 4. When the position of the host vehicle V can be measured by a sensor installed outside such as on the road, the position estimator 11 may estimate the position of the host vehicle V by receiving the measurement result of the sensor thorough the wireless communication.

The destination setter 12 sets a destination of the host vehicle V based on the instruction input to the HMI 7 by the occupants of the host vehicle V. The destination setter 12 may set a single or a plurality of relay points from the current position to the final destination of the host vehicle V as the destination.

The path searcher 13 searches for a single or a plurality of paths for the host vehicle V to travel based on the position of the host vehicle V estimated by the position estimator 11 and the destination set by the destination setter 12. For example, the path searcher 13 may search for a single path for the host vehicle V to travel by autonomous driving. In addition, for example, all of the plurality of paths found by the path searcher 13 may be a path for the host vehicle V to travel by autonomous driving. In addition, for example, a part of the plurality of paths found by the path searcher 13 may be a single or a plurality of paths for the host vehicle V to travel by autonomous driving, and the other paths may be a single or a plurality of paths for the host vehicle V to travel by manual driving.

The continuation degree calculator 14a calculates a continuation degree of the autonomous driving on the path found by path searcher 13. The continuation degree means a degree of possibility of causing the host vehicle V to continuously travel by autonomous driving on the path for the host vehicle V to travel. Details of a method of calculating the continuation degree will be described below in detail.

The path selector 17 selects a path for the host vehicle V to travel from the paths found by the path searcher 13 based on the continuation degree calculated by the continuation degree calculator 14a. Details of a method of selecting the path will be described below.

The travel plan generator 18 generates a travel plan of the host vehicle V based on the path selected by the path selector 17, the information relating to the obstacle around the host vehicle V recognized by the external sensor 1, and the map information acquired from the map database 4. The travel plan is a trajectory on which the host vehicle V is proceeding on the path for the host vehicle V to travel. For example, the speed, the acceleration, the deceleration, the direction and the steering angle of the host vehicle V in each time are included in the travel plan. The travel plan generator 18 generates the travel plan such that the host vehicle V can travel on the path while satisfying standards such as safety, regulatory compliance, and driving efficiency. Furthermore, the travel plan generator 18 generates the travel plan of the host vehicle V so as to avoid the collision with the obstacle based on the situation of the obstacle around the host vehicle V.

The controller 19 controls the travelling of the host vehicle V by the autonomous driving based on the travel plan generated by the travel plan generator 18. The controller 19 outputs a control signal according to the travel plan to the actuator 6. In this way, the controller 19 controls the travelling of the host vehicle V such that the autonomous driving of the host vehicle V can be executed in accordance with the travel plan.

Figure 2:
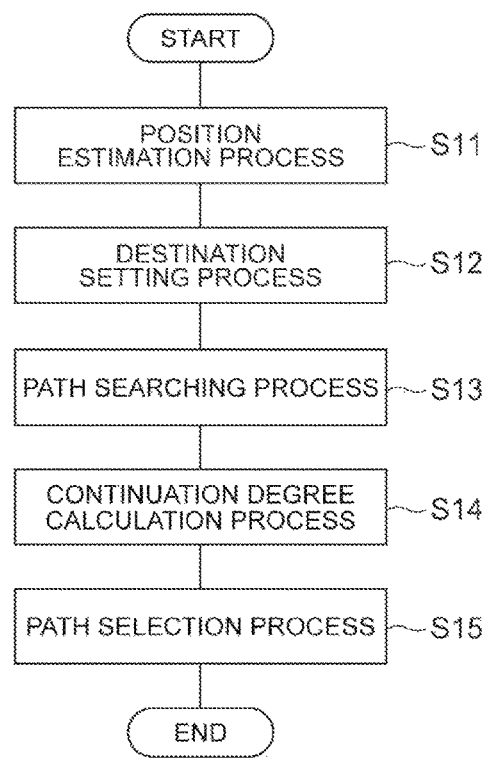
FIG. 2 is a flowchart illustrating an operation of the navigation device for the autonomously driving vehicle in FIG. 1.

Next, the processing executed in the navigation device 100a for the autonomously driving vehicle will be described in detail with reference to a flowchart in FIG. 2. As illustrated in FIG. 2, as a position estimation process, the position estimator 11 in the ECU 10a estimates the position of the host vehicle V on the map based on the position information of the host vehicle V received from the GPS receiver 2 and the map information in the map database 4 (S11). As a destination setting process, the destination setter 12 in the ECU 10a sets the destination of the host vehicle V based on the instruction input to the HMI 7 by the occupants (S12). As a path searching process, the path searcher 13 in the ECU 10a searches for a single or a plurality of paths for host vehicle V to travel based on the position of the host vehicle V estimated by the position estimator 11 and the destination set by the destination setter 12 (S13).

As a continuation degree calculation process, the continuation degree calculator 14a in the ECU 10a calculates the continuation degree of the autonomous driving in the path found by the path searcher 13 (S14). Hereinafter, the calculation of the continuation degree will be described in detail.

The continuation degree calculator 14a extracts a non-operation point of the autonomous driving on the path found in the path searching process by the path searcher 13 referring to the map database 4. The non-operation point means a point where the continuation of the autonomous driving becomes difficult. A point where the continuation of the autonomous driving becomes difficult in a probability of equal to or higher than a preset probability is included in the non-operation point in addition to a point where the continuation of the autonomous driving is not possible in a probability of equal to or higher than a preset probability. A point where the behavior of the host vehicle V becomes unstable in a probability of equal to or higher than a preset probability due to a fluctuation of the host vehicle V caused by the steering of steering angle equal to or larger than a threshold value or the deceleration equal to or larger than a threshold value even when the autonomous driving continues is included in the point where the continuation of the autonomous driving becomes difficult in a probability of equal to or higher than a preset probability. For example, a curve having a curvature equal to or larger than a threshold value (a sharp curve), an intersection (including a roundabout), a merging point, a branch point, a lane decreasing point, a lane increasing point, and a cross slope equal to or larger than a threshold value (a steep Kant) are included in the non-operation point. In the present embodiment, the continuation degree calculator 14a calculates the continuation degree using at least one of the various types of non-operation points described above. The information relating to the path and the non-operation point for calculating the continuation degree as described below is stored in the map database 4. The continuation degree calculator 14a calculates the continuation degree as described below referring to the information stored in the map database 4.

Figure 3:
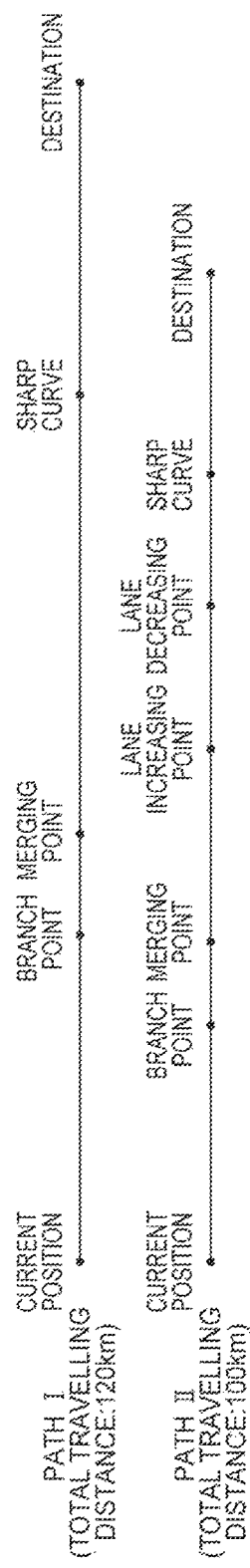
FIG. 3 is a diagram illustrating an example of a path of which a continuation degree is calculated by the navigation device for the autonomously driving vehicle in FIG. 1.

A path I and a path II illustrated in FIG. 3 can be assumed as an example. In the map database 4, as information relating to the path for the host vehicle V to travel and the non-operation point, the number of non-operation points is stored in advance. As illustrated in FIG. 3, a total travelling distance on the path I is 120 km. On the path I, one branch and one merging are present at the interchanges and one sharp curve point is present. Therefore total three non-operation points are present. A total travelling distance on the path II is 100 km and shorter than that on the path I. However, on the path II, one branch point and one merging point are present at the service area respectively, one lane increasing point and one lane decreasing point are present at a climbing lane respectively, and one sharp curve is present. Therefore, total five non-operation points are present. The continuation degree calculator 14a calculates the continuation degree as an inverse number of the number of points $N_1$ referring to the number of non-operation points $N_1$ on the path stored in the map database 4. That is, the continuation degree can be expressed as Equation (1) below. For example, when continuation degree is calculated by the Equation (1) below, even though the total travelling distance on path II is shorter than that on the path I, the continuation degree of the path I becomes larger than that of the path II.

$$\text{continuation degree} = 1/N_1 \quad (1)$$

In addition, the number of non-operation points N1 may be weighted by a probability that the continuation of the autonomous driving becomes difficult in each of the non-operation points. When the number of non-operation points N1 is weighted by a probability that the continuation of the autonomous driving becomes difficult in each of the non-operation points, the probability that the continuation of the autonomous driving becomes difficult for each non-operation point on the path are stored in the map database 4 as the information relating to the path for host vehicle V to travel and the non-operation point. For example, if the probability that the continuation of the autonomous driving becomes difficult at the merging point is 30%, the continuation degree calculator 14a multiplies the number of merging points by 0.3 referring to the probability of 30% that the continuation of the autonomous driving becomes difficult at the merging point stored in the map database 4. The continuation degree calculator 14a may obtain a sum of the probabilities that the continuation of the autonomous driving becomes difficult for each of the non-operation points as the number of non-operation points $N_2$, and then, may calculate the continuation degree as an inverse number of the number of non-operation points $N_2$. That is, for example, when the probabilities that the continuation of the autonomous driving becomes difficult at each of the sharp curve, the intersection, the merging pint, the branch point, the lane decreasing point, the lane increasing point, and the sharp Kant are respectively m, n, o, p, q, r, and s, the continuation degree can be expressed as Equation (2) below. When the continuation degree is expressed as Equation (2) below, the types of the sharp curves which is the non-operation points on the path and the probabilities m to s that the continuation of the autonomous driving becomes difficult for each types of the non-operation points on the path are stored in the map database 4. The continuation degree calculator 14a can calculate the continuation degree using Equation (2) below referring to the map database 4.

$$\text{continuation degree} = 1/N_2 = 1/[(\text{number of sharp curve points}) \times m + (\text{number of intersection points}) \times n + (\text{number of merging points}) \times o + (\text{number of branch points}) \times p + (\text{number of lane decreasing points}) \times q + (\text{number of lane increasing points}) \times r + (\text{number of sharp Kant points}) \times s] \quad (2)$$

In addition, continuation degree calculator 14a may calculate the continuation degree by dividing the total travelling distance by the number of non-operation points $N_1$ or the number of non-operation points $N_2$. Regarding the number of non-operation points $N_1$ and $N_2$, the continuation degrees can be expressed as Equations (3) and (4) described below. A denominator $[N_1/(\text{total travelling distance})]$ in Equation (3) and a denominator $[N_2/(\text{total travelling distance})]$ in Equation (4) represent the number of non-operation points per unit distance. When the continuation degrees can be expressed as Equations (3) and (4) described below, the map database 4 stores the total travelling distance of the host vehicle V on the path as the information relating to the path and the non-operation points for the host vehicle V to travel in addition to the information necessary for calculating the number of points $N_1$ or $N_2$ described above. The continuation degree calculator 14a can calculate the continuation degree by Equation (3) or Equation (4) described below referring to the map database 4.

$$\text{continuation degree} = 1/[N_1/(\text{total travelling distance})] \quad (3)$$

$$\text{continuation degree} = 1/[N_2/(\text{total travelling distance})] \quad (4)$$

Figure 4:
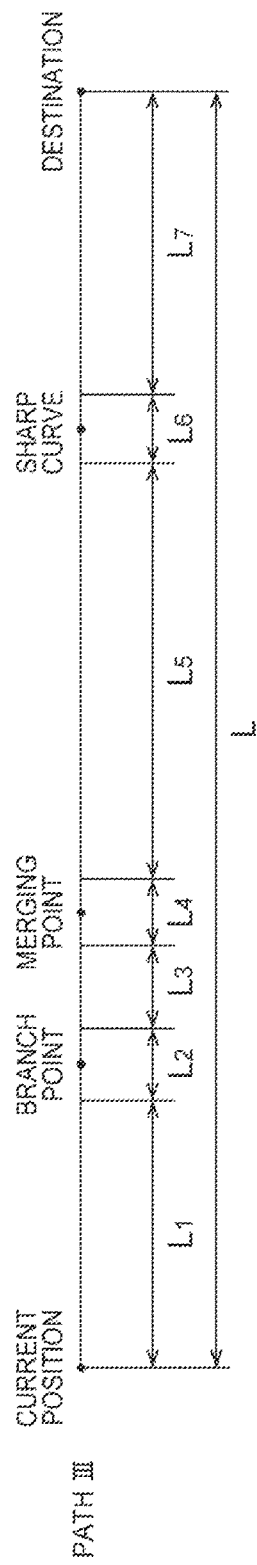
FIG. 4 is a diagram illustrating an example of a path of which a continuation degree is calculated by the navigation device for the autonomously driving vehicle in FIG. 1.

Next, a path III illustrated in FIG. 4 is assumed. As illustrated in FIG. 4, one branch point, one merging point, and one sharp curve which are the non-operation points are present in the path III. A total travelling distance on the path III is L. Non-operation distances at the each of the branch point, the merging point, and the sharp curve are $L_2$, $L_4$, and $L_6$ respectively. The non-operation distance is a length of the path of which the continuation of the autonomous driving becomes difficult in the vicinity of the non-operation point. An operation distance from the current point to the branch point is $L_1$, an operation distance between the branch point and the merging point is $L_3$, an operation distance between the merging point and the sharp curve is $L_5$, and an operation distance from the sharp curve to the destination is $L_7$. The operation distance is a length of the path of which the continuation of the autonomous driving does not become difficult. The operation distance may be set to a distance in which the autonomous driving can be stably continued equal to longer than a preset distance, and then, a distance in which the autonomous driving can be stably continued only shorter than the preset distance may be excluded from the operation distance.

The continuation degree calculator 14a may calculate the continuation degree by dividing the total operation distance on the path by the total travelling distance on the path. The total operation distance is a sum of the operation distances on the path. For example, the continuation degree in the path III can be expressed as Equation (5) below. When the continuation degree is expressed as Equation (5) below, the map database 4 stores the total operation distance on the path or the individual operation distance on the path, and the total travelling distance of the host vehicle V on the path as the information relating to the path and the non-operation points for the host vehicle V to travel. The continuation degree calculator 14a can calculate the continuation degree using Equation (5) referring to the map database 4.

$$\text{continuation degree} = (\text{total operation distance})/(\text{total travelling distance}) = (L_1 + L_3 + L_5 + L_7)/L \quad (5)$$

In addition, the continuation degree calculator 14a may calculate the continuation degree as an inverse number of the total non-operation distance. For example, the continuation degree in the path III can be expressed as Equation (6) below. When the continuation degree is expressed as Equation (5) below, the map database 4 stores the total non-operation distance on the path or the individual total non-operation distance as the information relating to the path and the non-operation points for the host vehicle V to travel. The continuation degree calculator 14a can calculate the continuation degree using Equation (6) referring to the map database 4.

$$\text{continuation degree} = 1/(\text{total non-operation distance}) = 1/(L_2 + L_4 + L_6) \quad (6)$$

In addition, the continuation degree calculator 14a may calculate the continuation degree as an average operation distance. The average operation distance is an average of the length of the path of which the continuation of the autonomous driving does not become difficult, and is a value obtained by dividing the total operation distance by the number of sections in the operation distance. For example, the continuation degree in the path III can be expressed as Equation (7) below. In Equation (7) and the like, the average operation distance is represented by $L_{-ave}$. When the continuation degree is expressed as Equation (7) below, the map database 4 stores the average operation distance as the information relating to the path and the non-operation points for the host vehicle V to travel. In addition, map database 4 may store the total operation distance or the individual operation distance, and the number of sections in the operation distance. The continuation degree calculator 14a can calculate the continuation degree using Equation (7) referring to the map database 4.

$$\text{continuation degree} = (\text{average operation distance}) = (\text{total operation distance})/(\text{number of sections in the operation distance}) = (L_1 + L_3 + L_5 + L_7)/4 = L_{-ave} \quad (7)$$

In addition, the continuation degree calculator 14a may calculate the continuation degree by dividing the average operation distance by the sum of the average operation distance and an average non-operation distance. The average non-operation distance is an average of the length of the path of which the continuation of the autonomous driving becomes difficult, and is a value obtained by dividing the total non-operation distance by the number of sections in the non-operation distance. For example, the continuation degree of the path III can be expressed as Equation (8) below. When the continuation degree can be expressed as Equation (8) below, the map database 4 stores the average operation distance and the average non-operation distance are stored as the information relating to the path and the non-operation points for the host vehicle V to travel. In addition, the map database 4 may store the average operation distance, total non-operation distance or the individual non-operation distance, and the number of sections in the non-operation distance. The continuation degree calculator 14a can calculate the continuation degree using Equation (8) below referring to the map database 4.

$$\text{continuation degree} = (\text{average operation distance})/[(\text{average operation distance}) + (\text{average non-operation distance})] L_{-ave}/[L_{-ave} + \{(L_2 + L_4 + L_6)/3\}] \quad (8)$$

In addition, the continuation degree calculator 14a may calculate the continuation degree as a maximum value of the operation distance on the path. For example, the continuation degree of the path III can be expressed by L5. When the continuation degree calculator 14a calculates the continuation degree as a maximum value of the operation distance on the path, the map database 4 stores the maximum value of the operation distance on the path as the information relating to the path and the non-operation points for the host vehicle V to travel. The continuation degree calculator 14a can calculate the maximum value of the operation distance on the path as the continuation degree referring to the map database 4.

Each of the total travelling distance, the operation distance, the non-operation distance, the total operation distance, the total non-operation distance, the average operation distance, and the average non-operation distance described above can be replaced by the total travelling time, the operation time, the non-operation time, the total operation time, the total non-operation time, the average operation time, and the average non-operation time which are obtained by respectively dividing the total travelling distance, the operation distance, the non-operation distance, the total operation distance, the total non-operation distance, the average operation distance, and the average non-operation distance described above by the expected travelling speed (for example, a legal speed) at each of those sections. In addition, each of the total travelling distance, the operation distance, the non-operation distance, the total operation distance, the total non-operation distance, the average operation distance, average non-operation distance, the total travelling time, operation time, the non-operation time, the total operation time, the total non-operation time, the average operation time, and the average non-operation time described above are not necessarily stored in the map database 4. For example, the map database 4 may store only the information on the position (the longitude, latitude, or the like) of the non-operation point and the path, and, when calculating the continuation degree, the continuation degree calculator 14a may calculate each of the total travelling distance, the operation distance, the non-operation distance, the total operation distance, the total non-operation distance, the average operation distance, the average non-operation distance, the total travelling time, operation time, non-operation time, the total operation time, the total non-operation time, the average operation time, and the average non-operation time described above based on the position of the non-operation point and the path.

Figure 5:
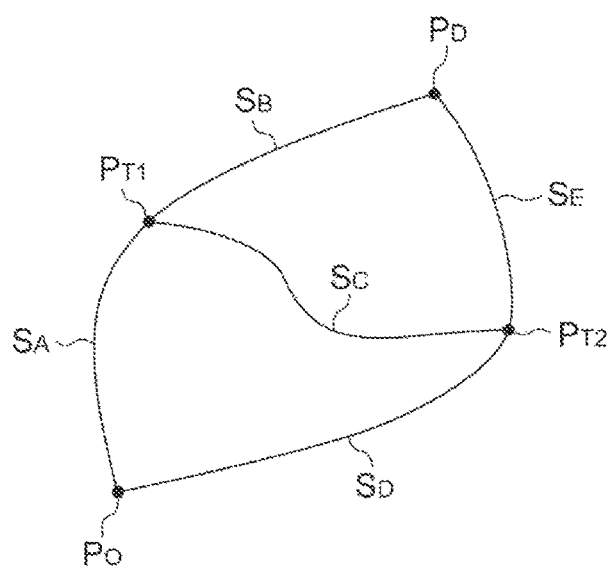
FIG. 5 is a diagram illustrating an example of a path of which a continuation degree is calculated by the navigation device for the autonomously driving vehicle in FIG. 1.

Next, a path illustrated in FIG. 5 is assumed. As illustrated in FIG. 5, the continuation degree calculator 14a may set relay points $P_{T1}$ and $P_{T2}$ between the current point $P_O$ and the destination $P_D$. The continuation degree calculator 14a may calculate the continuation degree at each of the sections $S_A$, $S_B$, $S_C$, $S_D$, and $S_E$ and may sum the continuation degrees of the sections corresponding to the selectable path. For example, in the example in FIG. 5, with regard to a path through a section $S_A$ to $S_B$, a path through a section $S_A$, $S_C$, to $S_E$, a path through a section $S_D$ to $S_E$, and a path through a section $S_D$, $S_C$, to $S_B$, the continuation degree calculator 14a may respectively calculate the value in which the continuation degrees on each of the sections are summed as the continuation degree of each path.

Returning to FIG. 2, as the path selection process, the path selector 17 in the ECU 10a selects the path for the host vehicle V to travel from the paths found by the path searcher 13 based on the continuation degree calculated by the continuation degree calculator 14a (S15). The path selector 17 selects the path which is calculated as described above and having the highest continuation degree from the paths found by the path searcher 13. The path selector 17 may select the path with combining the continuation degree and other conditions such as the total travelling distance, the shortest total travelling distance, the total travelling time, the shortest total travelling time, the road toll, the priority of general road and the highway. When the continuation degree calculator 14a calculates the continuation degree as a maximum value of the operation distance on the path, the path selector 17 may not necessarily select the path having the highest continuation degree among the paths found by the path searcher 13. For example, the path selector 17 may select the path having the lowest continuation degree among the paths found by the path searcher 13. The path selector 17 displays the selected path to the occupants of the host vehicle V through the HMI 7. The path selector 17 selects one path for the host vehicle V to travel. However, for example, if there is no path that satisfies the preset conditions such as the continuation degree among the paths found by the path searcher 13, the path selector 17 may display a notification indicating there is no path to be selected on the HMI 7. When the path selector 17 displays a notification indicating there is no path to be selected on the HMI 7, for example, the host vehicle V can travel by the manual driving.

According to the present embodiment, the continuation degree of the autonomous driving in the paths found by the path searcher 13 is calculated by the continuation degree calculator 14a. In addition, the path for the host vehicle V to travel is selected by the path selector 17 from the paths found by the path searcher 13 based on the continuation degree of the autonomous driving. Therefore, it is possible to select the path for the host vehicle V to travel by autonomous driving while including the degree of continuation of the autonomous driving in the conditions for selecting the path.

In addition, in the present embodiment, the path having the highest continuation degree is selected by the path selector 17. Therefore, in the situation in which it is not possible to perform the autonomous driving, the driving state of the host vehicle V can be switched to the manual driving from the autonomous driving, and thus, it is possible to reduce as much as possible the frequency of occurrence of the situation that the driver of the host vehicle V has to perform the manual driving operation. In addition, even if the continuation of the autonomous driving at the non-operation point does not become difficult, the driver can be notified of the situation that the behavior of the host vehicle V is unstable during the autonomous driving or that the autonomous driving becomes unstable through the HMI 7. Therefore, it is possible to reduce the frequency of feeling troublesomeness or an anxiety for the driver.

Second Embodiment

Figure 6:
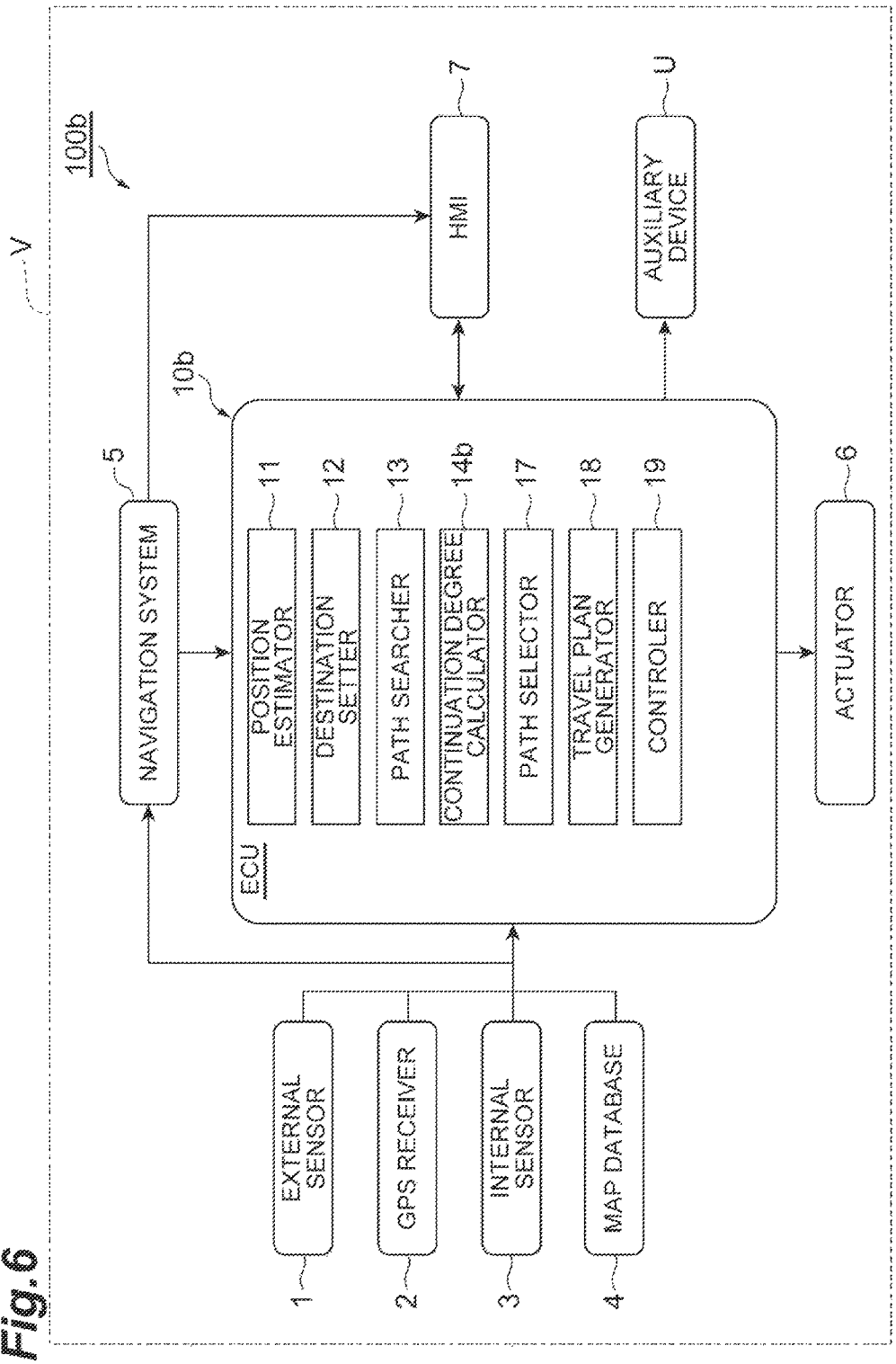
FIG. 6 is a block diagram illustrating a configuration of a navigation device for the autonomously driving vehicle in a second embodiment.

Next, the second embodiment will be described. In the description of the present embodiment, points different from that in the first embodiment will be described. As illustrated in FIG. 6, in the present embodiment, the point different from that in the first embodiment is a point that a navigation device 100b for the autonomously driving vehicle includes a continuation degree calculator 14b in an ECU 10b.

Similarly to the first embodiment, the navigation device 100b for the autonomously driving vehicle performs the position estimation process, the destination setting process, the path searching process, and the path selection process. In the present embodiment, processing described below is executed in the continuation degree calculation process. In the continuation degree calculation process, the continuation degree calculator 14*b* calculates the continuation degree based on a density of the non-operation points where the continuation of the autonomous driving becomes difficult in the paths found by the path searcher 13. The density means a degree of the concentration of the non-operation points. The density can be calculated as an inverse value of the standard deviation σ of the position of each non-operation point represented by the distance from any of the current point or the destination to the non-operation point, for example. For example, in the present embodiment, the continuation degree can be expressed as Equation (9) below. The map database 4 stores the density of the non-operation points on the path, for example, the standard deviation of the positions of the non-operation points as the information relating to the path and the non-operation points for the host vehicle V to travel. The continuation degree calculator 14*a* can calculate the continuation degree using Equation (9) below referring to the map database 4.

$$\text{continuation degree} = (\text{density of non-operation points}) = 1/(\text{standard deviation } \sigma \text{ of the positions of the non-operation points}) \quad (9)$$

Figure 7:
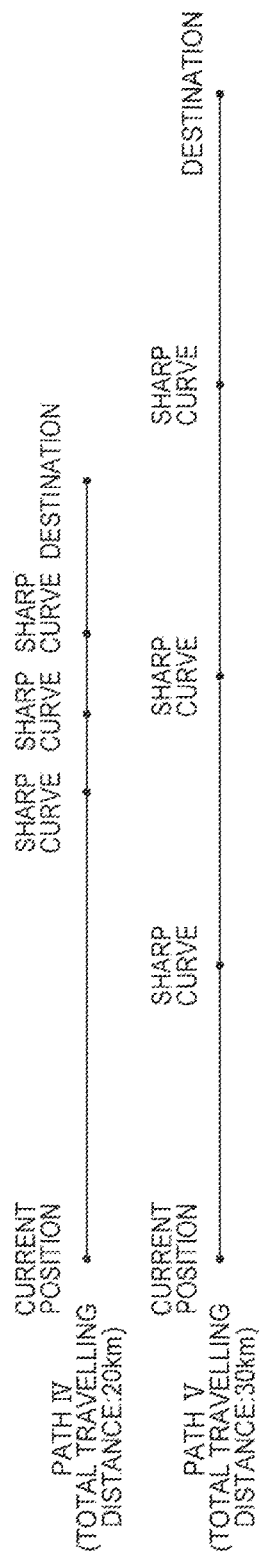
FIG. 7 is a diagram illustrating an example of a path of which a continuation degree is calculated by the navigation device for the autonomously driving vehicle in FIG. 6.

A path IV and a path V illustrated in FIG. 7 is assumed as examples. Three points of sharp curves are present in the path IV and path V respectively, and thus, the number of non-operation points is three. The total travelling distance of the path IV is 20 km and the total travelling distance of the path V is 30 km. As described in the first embodiment, when the continuation degree is calculated by dividing the total travelling distance of the path by the number of non-operation points, the continuation degree of path V becomes higher than that of the path IV. However, since the density of the non-operation on the path IV is larger than that on the path V, the continuation degree of the path IV becomes higher than that of the path V in the present embodiment. In the path selection process in the present embodiment, the path selector 17 selects the path IV of which the continuation degree is highest.

At the non-operation points where the autonomous driving becomes impossible, the driving mode can be switched to the manual driving by driver of the host vehicle V from the autonomous driving. Therefore, the density of the non-operation points directly affects whether the time of performing the manual driving by the driver is continuous or intermittent. According to the present embodiment, the continuation degree is calculated by the continuation degree calculator 14*b* based on the density of non-operation points where the autonomous driving becomes impossible on the paths found by the path searcher 13. Therefore, it is possible to select the path for the host vehicle V to travel by autonomous driving while including the density of the non-operation points that directly affects whether the time of performing the manual driving by the driver is continuous or intermittent in the conditions for selecting the path.

In the present embodiment, a high continuation rate means a situation that the non-operation points are concentrated at a certain position. In other words, the high continuation rate means that the time during which a stable autonomous driving is possible is continuous throughout the path. When the non-operation points are concentrated at a certain position, for example, a plurality of non-operation points which are concentrated in a short section is regarded as one non-operation point, and thus, it is possible to reduce the troublesomeness of the driver of the host vehicle V. That is because a time period for the driver of the host vehicle V to prepare the manual driving operation is only one short time period.

On the other hand, in the present embodiment, a low continuation rate means a situation that the time during which a stable autonomous driving is possible is intermittent. If the time during which a stable autonomous driving is possible is intermittent, when the host vehicle V travels a little, the behavior of the host vehicle V in the autonomous driving becomes unstable at the first non-operation point and it becomes necessary for the driver of the host vehicle V to prepare to perform the manual driving operation. In addition, when the host vehicle V travels a little from the first non-operation point, the behavior of the host vehicle V in the autonomous driving becomes unstable at the second non-operation point again and it becomes necessary for the driver of the host vehicle V to prepare to perform the manual driving operation again. When the host vehicle V travels a little, the behavior of the host vehicle V in the autonomous driving becomes unstable at the non-operation point and it becomes necessary for the driver of the host vehicle V to prepare to perform the manual driving operation, it is possible that the driver of the host vehicle feels the troublesomeness. Therefore, in the present embodiment, a path of which the density of the non-operation points is high is selected with priority.

In the present embodiment, as the density of the non-operation points where the autonomous driving becomes impossible becomes higher among the paths found by the path searcher 13, the continuation degree calculator 14*b* may calculate the higher continuation degree, and then, the path selector 17 may select the path having the lowest continuation degree. When as the density of the non-operation points becomes higher, the continuation degree calculator 14*b* calculates the higher continuation degree, and then, the path selector 17 selects the path having the lowest continuation degree, the path of which the density of the non-operation points is lowest is lowest is selected. In this way, for example, it is possible for the driver of the host vehicle V to maintain a proper concentration without being in over-confidence in the autonomous driving.

Third Embodiment

Figure 8:
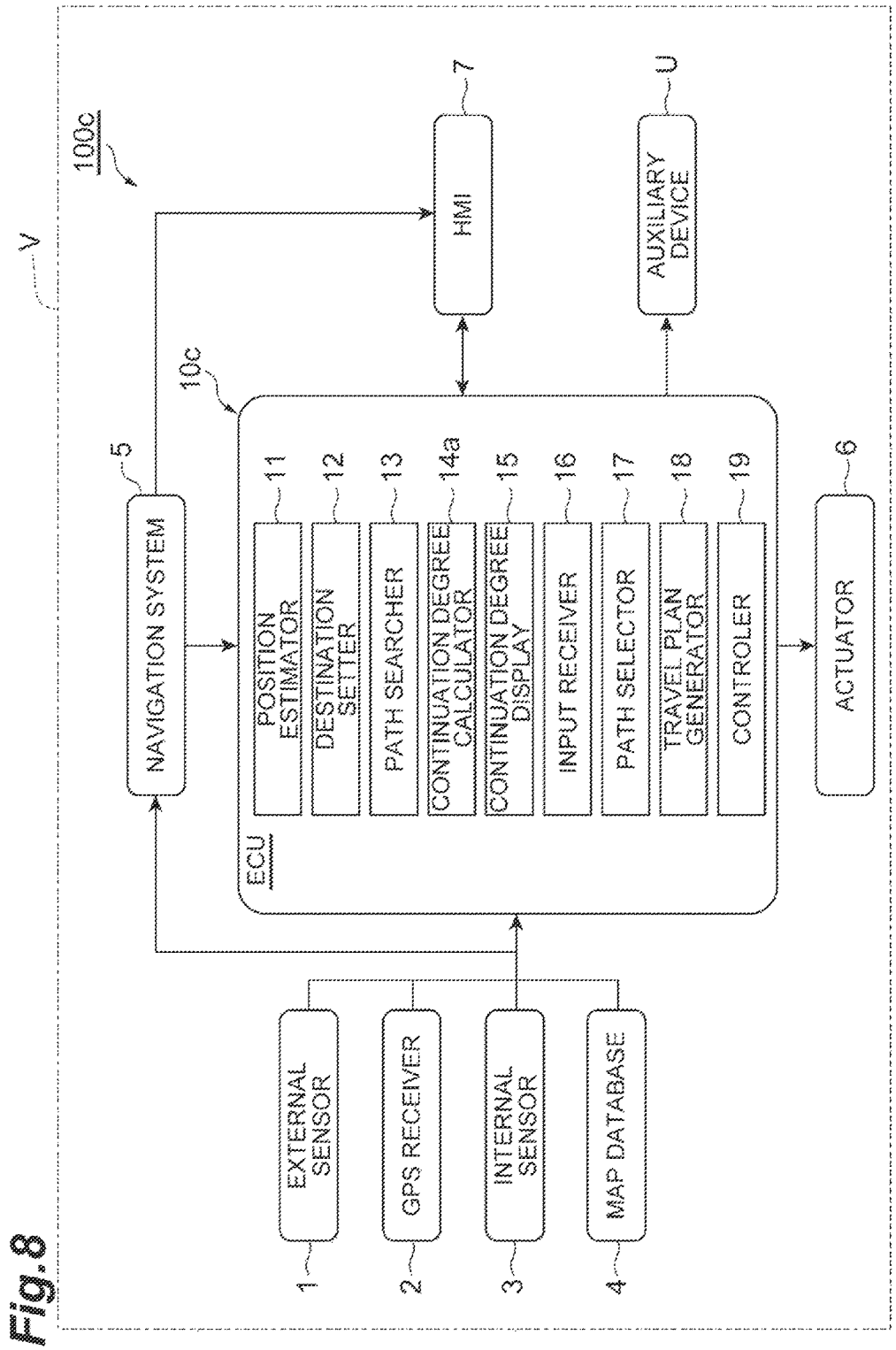
FIG. 8 is a block diagram illustrating a configuration of a navigation device for the autonomously driving vehicle in a third embodiment.

Next, a third embodiment will be described. In the description of the present embodiment, points different from that in the first embodiment will be described. As illustrated in FIG. 8, the point different from that in the first embodiment is a point that a navigation device 100*c* for the autonomously driving vehicle in the present embodiment includes a continuation degree display 15 and an input receiver 16 in an ECU 10*c*. The continuation degree display 15 displays the continuation degree of the path calculated by the continuation degree calculator 14*a* to the occupants of the host vehicle V.

The continuation degree display 15 displays each of the paths found by the path searcher 13 on, for example, the display panel or the touch panel in the HMI 7, and displays the continuation degree of the path by a numeral value or a shape indicating the size of the continuation degree in the vicinity of each displayed path. In addition, the continuation degree display 15 displays each of the paths found by the path searcher 13 on, for example, the touch panel of the HMI 7, and when one of the displayed paths is selected by the occupants, the continuation degree display 15 may display the continuation degree of the path by a numeral value or a shape indicating the size of the continuation degree in the vicinity of the selected path, or may output the continuation degree of the path through the speaker of the HMI 7 as a voice. In addition, the continuation degree display 15 may display each of the paths found by the path searcher 13 on, for example, the display panel or the touch panel in the HMI 7, and displays the continuation degrees of each of the displayed paths by a shape, pattern, brightness, or color of the path.

The instruction from the occupants of the host vehicle V is input to the input receiver 16. The input receiver 16 can input the instruction from the occupants of the host vehicle V by an input operation by the occupants to the display panel or the touch panel of the HMI 7 or by a voice input to a microphone of the HMI 7. The instruction from the occupants input to the input receiver 16 is an instruction of selecting one path from the paths found by the path searcher 13. In addition, the instruction from the occupants input to the input receiver 16 may be an instruction to select a plurality of paths from the paths found by the path searcher 13. In addition, the instruction from the occupants input to the input receiver 16 may be conditions such as a lower limit value or an upper limit value of the continuation degree, the total travelling distance, the total travelling time, and the road toll for selecting a single or a plurality of paths from paths found by the path searcher 13. The conditions for selecting the path may be the conditions such as the shortest total travelling distance, the shortest total travelling time, the general road priority or the highway priority. If there is a plurality of conditions for selecting the path, the priority of those conditions may be included in the instruction from the occupants input to the input receiver 16.

Figure 9:
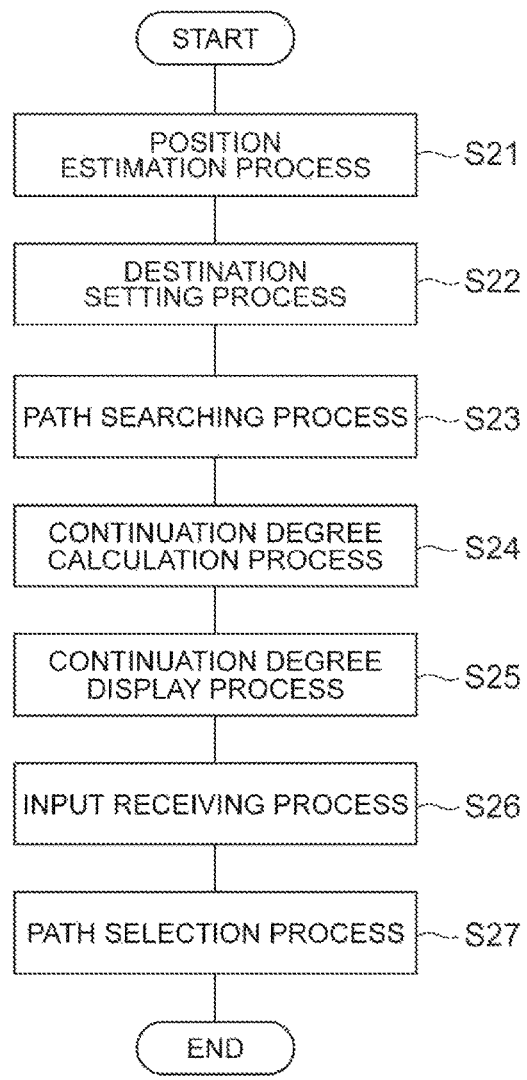
FIG. 9 is a flowchart illustrating an operation of the navigation device for the autonomously driving vehicle in FIG. 8.

Next, the processing executed in the navigation device 100c for the autonomously driving vehicle will be described in detail with reference to a flowchart in FIG. 9. As illustrated in FIG. 9, the position estimation process (S21), the destination setting process (S22), the path searching process (S23) and the continuation degree calculation process (S24) similar to those in the first embodiment are executed by the navigation device 100c for the autonomously driving vehicle. As a continuation degree display process, the continuation degree display 15 displays the continuation degree of the path calculated by the continuation degree calculator 14a to the occupants of the host vehicle V (S25). As an input receiving process, the instruction from the occupants of the host vehicle V is input to the input receiver 16 (S26). As the input receiving process, the input receiver 16 may input the instruction from the occupants of the host vehicle V in advance such as above-described conditions for selecting the path before the continuation degree calculator 14a calculates the continuation degree.

As a path selection process, the path selector 17 selects the path for the host vehicle V to travel from the paths found by the path searcher 13 based on the instruction input to the input receiver 16 (S27). For example, when an instruction to select the path having the highest continuation degree is input to the input receiver 16, the path selector 17 selects the path having the highest continuation degree from the paths found by the path searcher 13. In addition, for example, when an instruction to select the path having the lowest continuation degree is input to the input receiver 16, the path selector 17 selects the path having the lowest continuation degree from the paths found by the path searcher 13. In addition, if there are a plurality of paths that satisfy the instruction from the occupants in the paths found by the path searcher 13, the path selector 17 selects one path for the host vehicle V to travel from those paths that satisfy the instruction from the occupants. Others are similar to those in the first embodiment.

According to the present embodiment, the continuation degree of the path calculated by the continuation degree calculator 14a is displayed to the occupants of the host vehicle V by the continuation degree display 15, and the instruction from the occupants of the host vehicle V is input to the input receiver 16. In this way, the occupants can input the instruction while taking the continuation degree into consideration. In addition, the path selector 17 selects the path for the host vehicle V to travel from the paths found by the path searcher 13 based on the instruction input to the input receiver 16. In this way, it is possible to select the path for the host vehicle V to travel by autonomous driving while including the instruction from the occupants into which the consideration of the continuation degree is taken, in the conditions for selecting the path.

Fourth Embodiment

Figure 10:
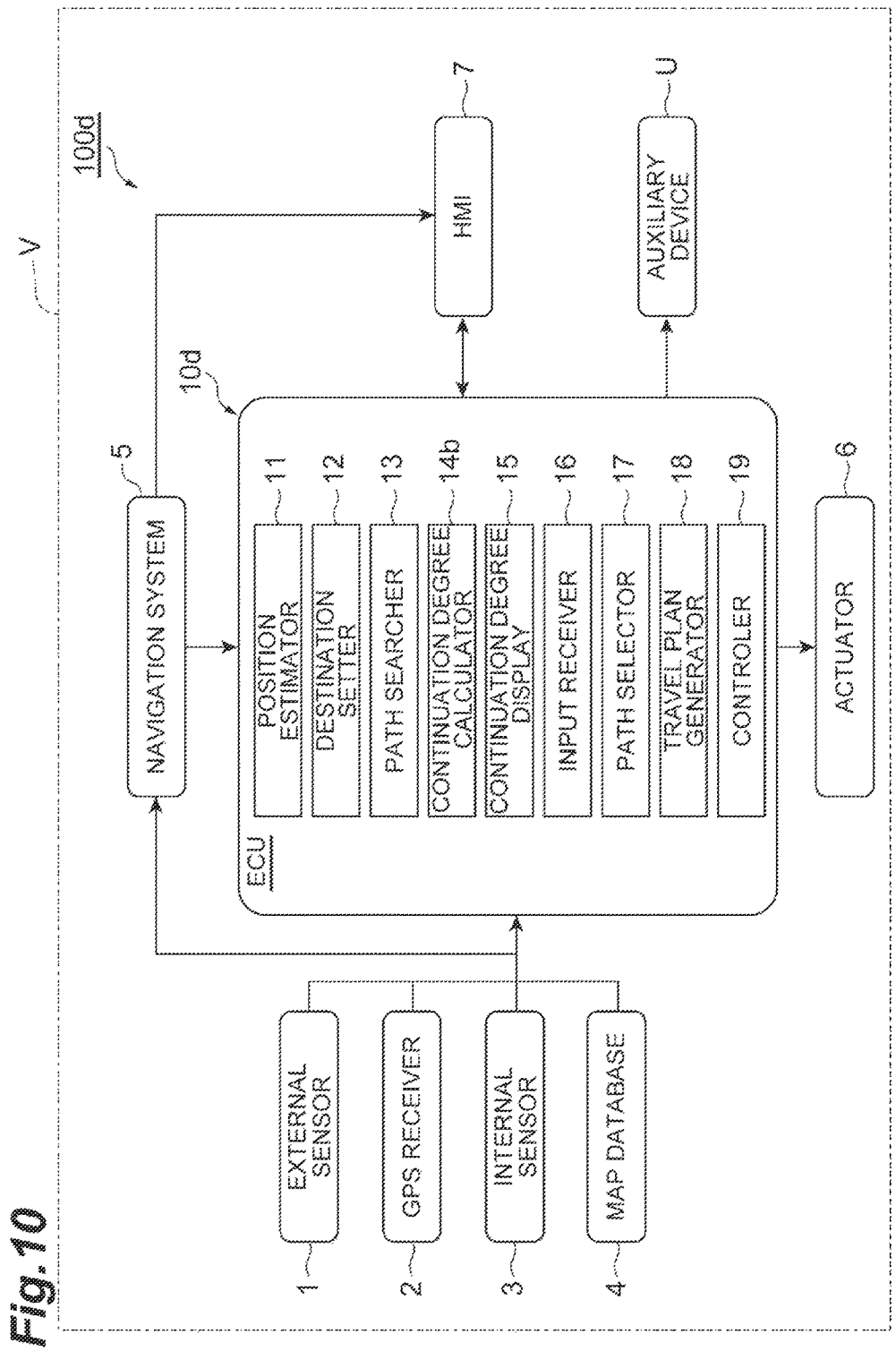
FIG. 10 is a block diagram illustrating a configuration of a navigation device for the autonomously driving vehicle in a fourth embodiment.

Next, a fourth embodiment will be described. In the description of the present embodiment, points different from that in the third embodiment will be described. As illustrated in FIG. 10, the point different from that in the third embodiment is that a navigation device 100d for the autonomously driving vehicle in the present embodiment includes a continuation degree calculator 14b in an ECU 10d, which is similar to that in the second embodiment. The navigation device 100d for the autonomously driving vehicle executes the position estimation process, the destination setting process, the path searching process, the continuation degree display process, the input receiving process and the path selection process that are similar to those in the third embodiment. In the continuation degree calculation process, the continuation degree calculator 14b in the ECU 10d executes the continuation degree calculation process similarly to the second embodiment. Other processes are the same as those in the third embodiment. The navigation device 100d for the autonomously driving vehicle in the present embodiment has effects of both the second and the third embodiments.

Fifth Embodiment

Figure 11:
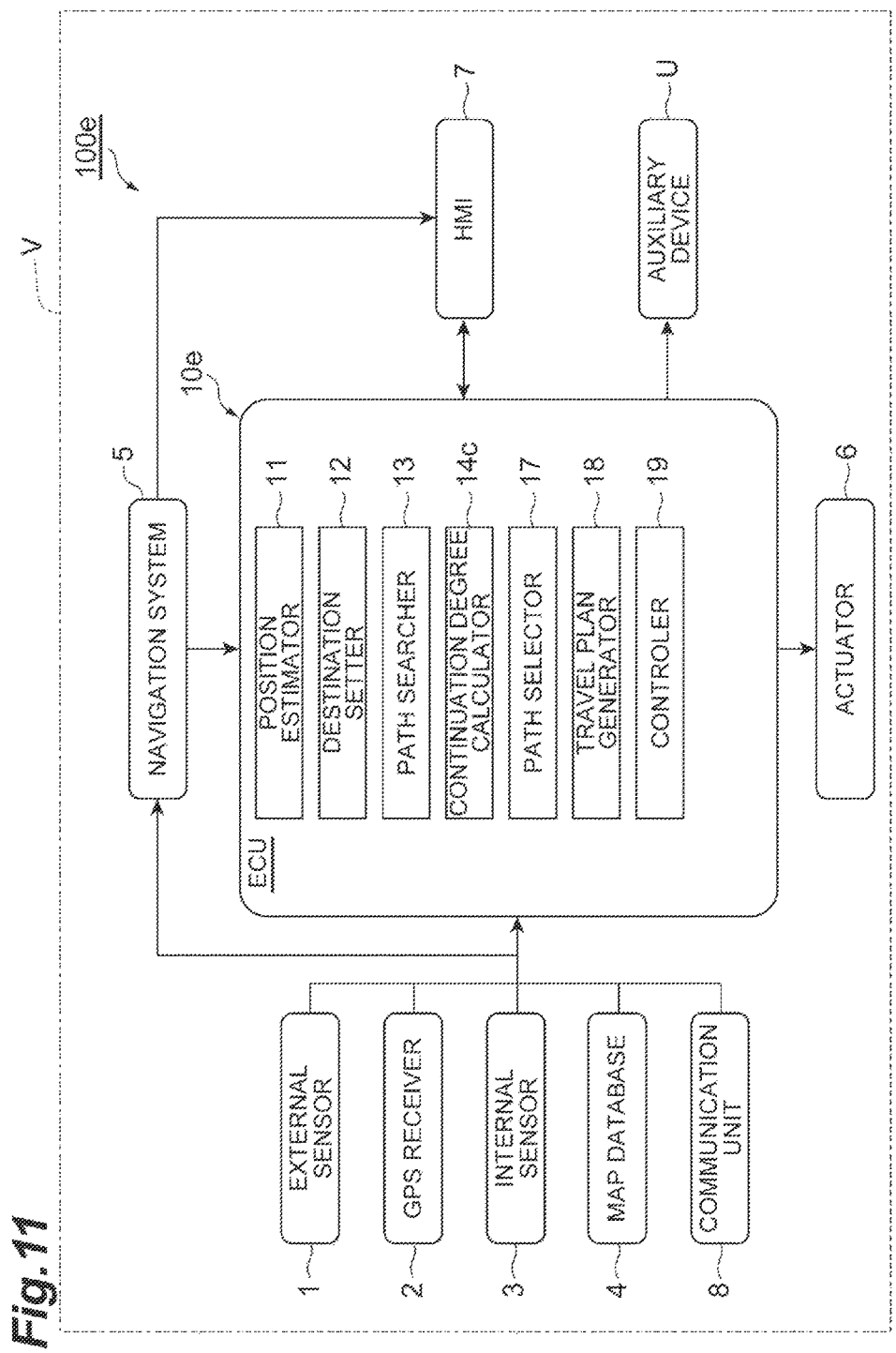
FIG. 11 is a block diagram illustrating a configuration of a navigation device for the autonomously driving vehicle in a fifth embodiment.

Next, a fifth embodiment will be described. In the description of the present embodiment, points different from that in the first embodiment will be described. As illustrated in FIG. 11, a navigation device 100e for the autonomously driving vehicle in the present embodiment includes a communication unit 8. In addition, the navigation device 100e for the autonomously driving vehicle includes a continuation degree calculator 14c in an ECU 10e.

The communication unit 8 receives information from a facility installed on the road or the information processing center or the like via the wireless communication. For example, the positions of falling objects, a disabled vehicle, an accident, a bad weather, a construction, and a construction after the date of creating the data in the map database 4 on the path are included in the information received by the communication unit 8. The positions of the falling objects or the like on the path become the non-operation points. There is a possibility that the actual shape of the road at the position of the construction performed after the date of creating the data in the map database 4 may be different from that in the data stored in the map database 4, and thus, it becomes the non-operation point. In addition, for example, the positions of a point where a friction of the demarcation lines (lane lines, yellow lines) of the lane of the road occurred, a point where the traffic volume becomes higher than that in a rush hour set in advance, and a point where the number of pedestrians becomes greater than a preset number are included in the information received by the communication unit 8. The communication unit 8 may be included in the navigation system 5. In addition, the map database 4 may update the information stored in the map database 4 based on the information received by the communication unit 8.

The continuation degree calculator 14c calculates the continuation degree with the positions in the information received by the communication unit 8 as the non-operation point similarly to the first embodiment. Others are similar to those in the first embodiment.

According to the present embodiment, even when the situation in which the position of the falling objects or the like that is not included in the map database 4 becomes the non-operation point is present on the paths found by the path searcher 13, the continuation degree calculator 14c can calculate the continuation degree in accordance with such a situation. The present embodiment can be embodied in combination with the second embodiment to the fourth embodiment.

Sixth Embodiment

Figure 12:
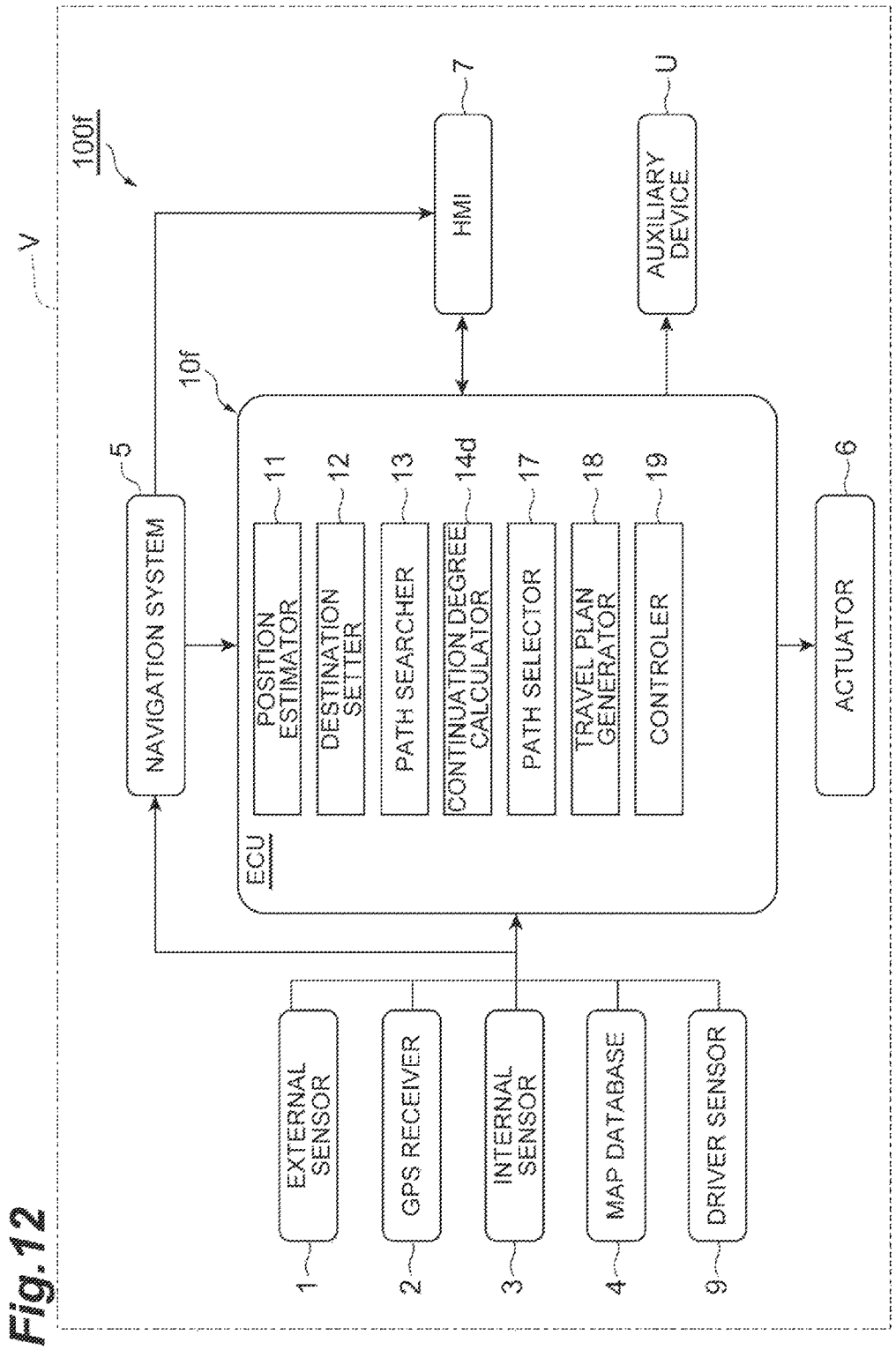
FIG. 12 is a block diagram illustrating a configuration of a navigation device for the autonomously driving vehicle in a sixth embodiment.

Next, a sixth embodiment will be described. In the description of the present embodiment, points different from that in the first embodiment will be described. As illustrated in FIG. 12, a navigation device 100f for the autonomously driving vehicle in the present embodiment includes a driver sensor 9. In addition, the navigation device 100f for the autonomously driving vehicle includes a continuation degree calculator 14d in an ECU 10f. The driver sensor 9 includes at least any of a steering sensor, an accelerator pedal sensor and a brake pedal sensor in addition to the configuration of the internal sensor 3 in the first embodiment.

The steering sensor is, for example, a detection device that detects an amount of operation of the steering operation by the driver of the host vehicle V to the steering wheel. The steering sensor is provided, for example, on a steering shaft of the host vehicle V. In addition, the steering sensor may be a sensor that detects whether or not the driver of the host vehicle V grasps the steering wheel, or detects a power of grasping the steering wheel by the driver.

The accelerator pedal sensor is a detection device that detects, for example, an amount of depression of the accelerator pedal. The amount of depression of the accelerator pedal is, for example, a position of the accelerator pedal (pedal position) with the position of the predetermined position as a reference. The predetermined position may be a fixed position or may be a position changed by a predetermined parameter. The accelerator pedal sensor is provided, for example, on a shaft portion of the accelerator pedal of the host vehicle V.

The brake pedal sensor is a detection device that detects, for example, an amount of depression of the brake pedal. The amount of depression of the brake pedal is, for example, a position of the brake pedal (pedal position) with the position of the predetermined position as a reference. The predetermined position may be a fixed position or may be a position changed by a predetermined parameter. The brake pedal sensor is provided, for example, on a shaft portion of the brake pedal of the host vehicle V. The brake pedal sensor may detect an operation power of the brake pedal (such as a depression power to the brake pedal or a pressure to a master cylinder). The steering sensor, the accelerator pedal sensor and the brake pedal sensor output the detected information to the ECU 10f.

The driver sensor 9 may include a sensor that detects a change of the posture, pulses, and brain waves of the driver of the host vehicle V.

The continuation degree calculator 14d causes the position where the number of times that the amount of operation of the steering operation or the amount of change of the posture of the driver of the host vehicle V by the driver sensor 9 is equal to or greater than a preset value is equal to or greater than the preset number to be stored in the map database 4 as the non-operation point similarly to the first embodiment. The continuation degree calculator 14d for example, may receive a position where the number of times that the amount of operation of the steering operation by the driver of another vehicle or the like is equal to or greater than a preset value is equal to or greater than the preset number through the wireless communication, and may cause the position to be stored in the map database 4 as the non-operation point. In addition, when causing host vehicle V to travel by autonomous driving, when the amount of operation of the steering operation detected by the driver sensor 9 is equal to or greater than the preset value, the controller 19 may switch the driving mode to the manual driving from the autonomous driving.

The continuation degree calculator 14d calculates the continuation degree similarly to the first embodiment with the position where the number of times that the amount of operation of the steering operation or the like by the driver of the host vehicle V detected by the driver sensor 9 is equal to or greater than a preset value is equal to or greater than the preset number as the non-operation point. Others are similar to those in the first embodiment.

According to the present embodiment, the continuation degree is calculated based on the position where it becomes necessary for the driver of the host vehicle V to prepare for performing the manual driving operation and the frequency thereof. Therefore, the continuation degree according to the situation of more realistic path can be calculated. The present invention can be embodied in a combination of the second embodiment to the fifth embodiment.

The embodiments of the present invention are described as above. However, the present invention is not limited to the embodiments described above, and can be embodied in various aspects. For example, in the embodiments described above, a part of the functions of the ECUs 10a to 10f may be executed by a computer in a facility such as an information processing center which is capable of communicating with the host vehicle V.

What is claimed is:

1. A navigation device for an autonomously driving host vehicle configured to select a path for the autonomously driving host vehicle, the navigation device comprising an electronic control unit (ECU) configured to:
    estimate a position of the autonomously driving host vehicle;
    set a destination of the autonomously driving host vehicle;
    search for a set of paths for the autonomously driving host vehicle to travel based on the position and the destination;
    calculate a first continuation degree of autonomous driving in a first path, of the set of paths, based on a first density, of a first set of non-operation points of the first path, that is indicative of how closely together non-operation points of the first set of non-operation points are disposed along the first path;

calculate a second continuation degree of autonomous driving in a second path, of the set of paths, based on a second density, of a second set of non-operation points of the second path, that is indicative of how closely together non-operation points of the second set of non-operations points are disposed along the second path; and select the first path for the autonomously driving host vehicle to travel from the set of paths based on the first continuation degree being greater than the second continuation degree and the first density being greater than the second density.

2. A method, comprising:

estimating, by an electronic control unit (ECU) of a navigation device of an autonomous vehicle, a position of the autonomous vehicle;

setting, by the ECU, a destination of the autonomous vehicle;

searching, by the ECU, for a set of paths for the autonomous vehicle to travel based on the position and the destination;

calculating, by the ECU, a first continuation degree of a first path, of the set of paths, based on a first density, of a first set of non-operation points of the first path, that is indicative of how closely together non-operation points, of the first set of non-operation points, are disposed along the first path;

calculating, by the ECU, a second continuation degree of a second path, of the set of paths, based on a second density, of a second set of non-operation points of the second path, that is indicative of how closely together non-operation points, of the second set of non-operation points, are disposed along the second path and that is less than the first density; and selecting, by the ECU, the first path, from the set of paths, for the autonomous vehicle to travel based on the first continuation degree being greater than the second continuation degree and the first density being greater than the second density.

3. The method of claim 2, further comprising:

multiplying a first type of non-operation point, of the first set of non-operation points, by a first probability to obtain a first value;

multiplying a second type of non-operation point, of the first set of non-operation points, by a second probability to obtain a second value; and where calculating the first continuation degree comprises:
calculating the first continuation degree based on the first value and the second value.

4. The method of claim 2, further comprising:

dividing a total operation distance of the first path by a total travelling distance of the first path; and where calculating the first continuation degree comprises:
calculating the first continuation degree based on dividing the total operation distance of the first path by the total travelling distance of the first path.

5. The method of claim 2, further comprising:

determining an inverse number of a total non-operation distance of the first path; and where calculating the first continuation degree comprises:
calculating the first continuation degree based on determining the inverse number of the total non-operation distance of the first path.

6. The method of claim 2, further comprising:

calculating an average operation distance based on a total operation distance and a number of sections of the first path associated with the total operation distance; and where calculating the first continuation degree comprises:
calculating the first continuation degree based on the average operation distance.

7. The method of claim 2, further comprising:

dividing an average operation distance by a sum of the average operation distance and an average non-operation distance; and where calculating the first continuation degree comprises:
calculating the first continuation degree based on dividing the average operation distance by the sum of the average operation distance and the average non-operation distance.

8. The method of claim 2, further comprising:

determining a total operation time and a total non-operation time associated with the first path; and where calculating the first continuation degree comprises:
calculating the first continuation degree based on the total operation time and the total non-operation time.

9. The method of claim 2, further comprising:

determining an inverse value of a standard deviation of a set of positions of the first set of non-operation points; and where calculating the first continuation degree comprises:
calculating the first continuation degree based on the inverse value.

10. The method of claim 2, further comprising:

receiving, by the ECU and from another device, a wireless communication including information identifying the first set of non-operation points; and where calculating the first continuation degree comprises:
calculating the first continuation degree based on the wireless communication including the information identifying the first set of non-operation points.

11. The method of claim 2, further comprising:

receiving, by the ECU and from a sensor of the autonomous vehicle, information that identifies a driver interaction with the autonomous vehicle; and storing, by the ECU, a location associated with the driver interaction as another non-operation point.

12. A device associated with an autonomous vehicle, comprising an electronic control unit (ECU) configured to:

estimate a position of the autonomous vehicle;

set a destination for the autonomous vehicle;

identify a set of paths for the autonomous vehicle based on the position of the autonomous vehicle and the destination for the autonomous vehicle;

determine a set of densities of a set of non-operation points for the set of paths for the autonomous vehicle wherein each density, of the set of densities, is indicative of how closely together respective non-operation points of the set of non-operation points are set together along respective paths of the set of paths; and select a path, of the set of paths, for the autonomous vehicle to travel based on a density, of the set of densities, of non-operation points, of the set of non-operation points, of the path being greater than other densities of non-operation points of other paths of the set of paths.

* * * * *